(12) United States Patent
Shahly et al.

(10) Patent No.: US 7,866,681 B1
(45) Date of Patent: Jan. 11, 2011

(54) SELF-GUIDED AIR SPRING ASSEMBLY

(75) Inventors: Frederick Shahly, Clarkston, MI (US);
Edwin Lorenz, Grand Blanc, MI (US);
Edward J. Eshelman, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 28 days.

(21) Appl. No.: 12/499,139

(22) Filed: Jul. 8, 2009

(51) Int. Cl.
*B60G 9/04* (2006.01)
*F16F 9/04* (2006.01)

(52) U.S. Cl. ............... 280/124.157; 267/64.14; 267/64.21; 267/64.19; 267/64.23

(58) Field of Classification Search ......... 280/124.145, 280/124.151, 124.154, 124.157; 267/64.14, 267/64.19, 64.21, 64.23
See application file for complete search history.

(56) References Cited

U.S. PATENT DOCUMENTS

| | | | | |
|---|---|---|---|---|
| 4,555,096 A | * | 11/1985 | Pryor ................ | 267/64.21 |
| 4,677,263 A | * | 6/1987 | Hamilton et al. ......... | 200/61.44 |
| 5,518,225 A | * | 5/1996 | Gubitz .................. | 267/64.24 |
| 5,752,692 A | * | 5/1998 | Crabtree et al. .......... | 267/64.24 |
| 5,954,316 A | * | 9/1999 | Voss ................... | 267/64.27 |
| 6,343,781 B1 | * | 2/2002 | Joseph ................ | 267/64.11 |
| 6,382,602 B1 | * | 5/2002 | Morrow ............... | 267/64.23 |
| 6,607,186 B2 | * | 8/2003 | Voelkel ............... | 267/64.27 |
| 7,175,165 B1 | * | 2/2007 | Vande Brake et al. .... | 267/64.24 |
| 7,322,567 B2 | | 1/2008 | Lloyd | |
| 2002/0163111 A1 | * | 11/2002 | Voelkel ............... | 267/64.27 |
| 2009/0212472 A1 | * | 8/2009 | Adonakis ............. | 267/64.21 |

* cited by examiner

*Primary Examiner*—Toan C To
(74) *Attorney, Agent, or Firm*—Carlson, Gaskey & Olds

(57) ABSTRACT

An air spring assembly includes a pedestal that has one end fixed to a suspension arm and includes a second end with a platform that supports an air spring assembly. An air spring piston is fixed to the platform. A lower portion of a flexible bellows is fixed to the air spring piston and an upper portion of the flexible bellows is mounted to a vehicle frame structure. A linear moveable member has one end fixed to the upper portion of said flexible bellows and an opposite end slidingly received within an internal cavity of the pedestal such that the upper and lower portions of the flexible bellows articulate linearly with respect to each other.

16 Claims, 4 Drawing Sheets ity assembly that utilizes such an air spring assembly.

SELF-GUIDED AIR SPRING ASSEMBLY

TECHNICAL FIELD

The subject invention relates to an air spring assembly having upper and lower portions that articulate linearly relative to each other over a large range of rebound/jounce travel, and which includes spring articulation assistance. The subject invention further relates to an independent suspension system that utilizes such an air spring assembly.

BACKGROUND OF THE INVENTION

Suspension air springs are utilized to provide good ground vehicle ride characteristics. However, for vehicle applications that require significant amounts of vertical articulation, i.e. have significant travel between jounce and rebound positions, traditional air springs do not always operate effectively. When there is significant vertical articulation, the air springs require additional assistance to enable them to articulate properly. If this assistance is not provided, air spring angles and offsets as measured from a top of the air spring to the bottom of the air spring could be excessive. This could result in premature wear of air spring components, which in turn adversely affects the life of the air spring.

SUMMARY OF THE INVENTION

An air spring assembly includes upper and lower portions that articulate linearly relative to each other over a large range of rebound/jounce travel, and further includes spring articulation assistance.

In one example, the air spring assembly includes a pedestal that has one end fixed to a suspension arm and includes a second end with a platform that supports an air spring assembly. An air spring piston is fixed to the platform. A lower portion of a flexible bellows is fixed to the air spring piston and an upper portion of the flexible bellows is mounted to a vehicle frame structure. A linear moveable member has one end fixed to the upper portion of the flexible bellows and an opposite end slidingly received within an internal cavity of the pedestal such that the upper and lower portions of the flexible bellows articulate linearly with respect to each other.

In one example, the linear moveable member comprises a rod that is received within a linear bearing mounted within the internal cavity of the pedestal.

In one example, the pedestal has one end mounted to the suspension arm at a first mount interface and has an opposite end extending into an interior chamber defined by the flexible bellows. The linear moveable member is connected to the upper portion of the flexible bellows and to the vehicle frame structure at a second mount interface.

In one example, the first and second mount interfaces include spherical bearing mounts.

In one example, the air spring assembly is incorporated into an independent suspension that includes an upper control arm and a lower control arm. Each of the upper and lower control arms comprise a wishbone configuration having a base end mountable to a vehicle wheel and a pair of arms that are mountable to a vehicle frame structure. The air spring assembly is mounted to one of the upper and lower control arms.

In one example, the independent suspension includes a shock absorber that is mounted to one of the upper and lower control arms independently of the air spring assembly.

These and other features of the present invention can be best understood from the following specification and drawings, the following of which is a brief description.

DETAILED DESCRIPTION OF THE PREFERRED EMBODIMENT

Figure 1:
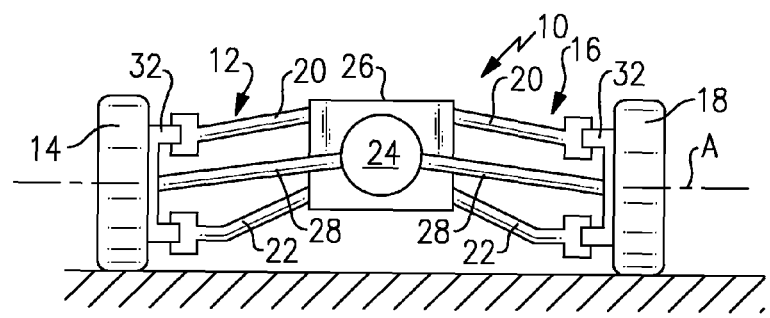
FIG. 1 is a front schematic representation of one example of an independent suspension system for a pair of laterally spaced wheels.

FIG. 1 shows a highly schematic representation of an independent suspension system 10 as used in a vehicle application that requires significant amounts of vertical articulation. The independent suspension system 10 includes a first suspension module 12 at a first wheel 14 and a second suspension module 16 at a second wheel 18 laterally spaced from the first wheel 14 along a wheel axis of rotation A. The first 12 and second 16 suspension modules operate independently of each other.

Each of the first 12 and second 16 suspension modules includes an upper control arm 20 and a lower control arm 22. A central carrier 24 provides driving input to the first 14 and second 18 wheels and is mounted to a vehicle frame structure 26. The vehicle frame structure can comprise a chassis, vehicle frame, or sub-frame structure for example. The carrier 24 drives wheel shafts 28 that are coupled to the first 14 and second 18 wheels. The wheel shafts 28 extend in a lateral direction between the upper 20 and lower 22 control arms from the carrier 24 to the respective wheel. The upper 20 and lower 22 control arms are mounted at one end to a respective wheel 14, 18 and at an opposite end to the vehicle frame structure 26.

Figure 2:
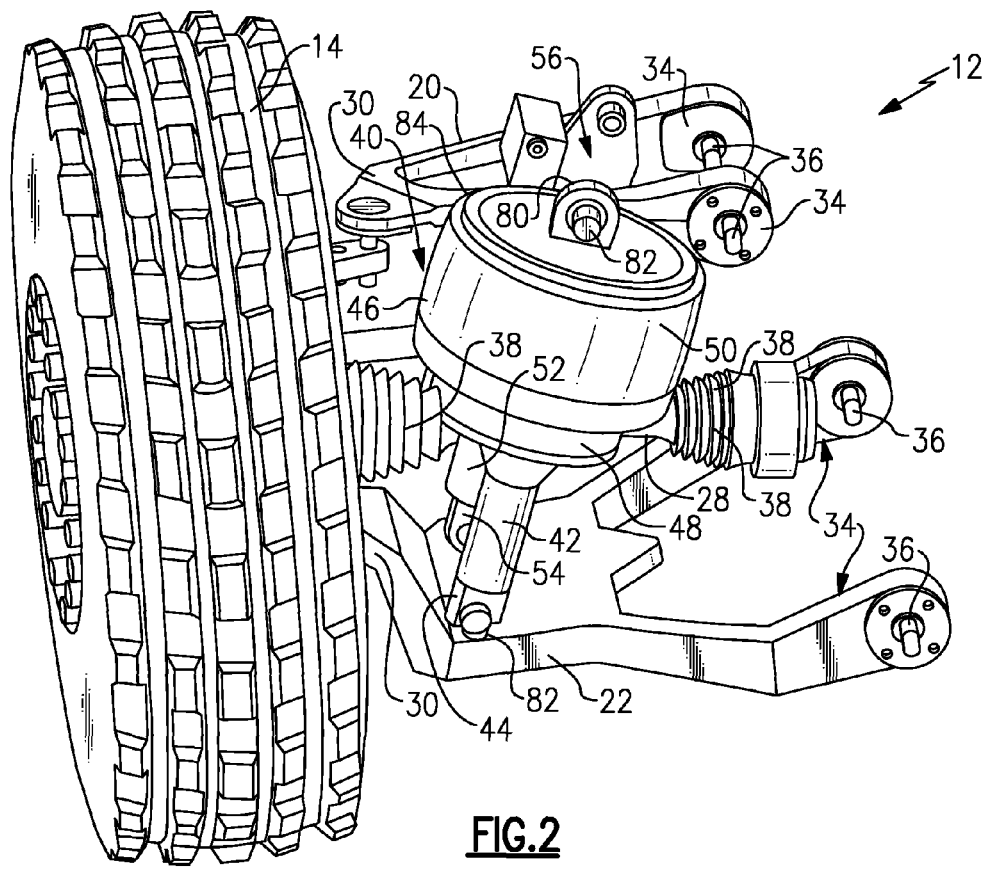
FIG. 2 is a perspective view of an independent suspension unit at one of the wheels.

FIG. 2 shows the first suspension module 12 in greater detail. It should be understood that the second suspension module 16 would be similarly configured. The upper 20 and lower 22 control arms each comprise a wishbone configuration having a base end 30 mounted to a knuckle 32 (FIG. 1) that supports the wheel 14 and a pair of arms 34 extending from the base end 30 toward the vehicle frame structure 26. The arms 34 each include pivot mount ends 36 that are connected to the vehicle frame structure 26.

As shown in FIG. 2, the wheel shaft 28 is positioned vertically between the upper 20 and lower 22 control arms. Resilient boots 38 surround and enclose the wheel shaft 28 to protect the rotating component from external contaminants.

An air spring assembly 40 is supported on the lower control arm 22. Optionally the air spring assembly 40 could be supported on the upper control arm 20. It should be noted that FIG. 1 excludes the air spring assemblies for clarity purposes.

The air spring assembly 40 is a self-guided structure and includes a pedestal 42 that has a first end 44 mounted to the lower control arm 22 at a first mount interface. The air spring assembly 40 also includes a flexible bellows 46 that has a lower portion 48 associated with the pedestal 42 and an upper portion 50 that is mountable to a vehicle frame structure at a second mount interface. In one example, the first and second mount interfaces comprise pivot mount interfaces. This will be discussed in greater detail below.

The suspension module 12 also includes a shock absorber 52 that is mounted to the lower control arm 22. Optionally, the shock absorber 52 could be mounted to the upper control arm 20. The shock absorber 52 is mounted independently of the air spring assembly 40, i.e. the shock absorber 52 is not co-axial with the air spring assembly 40. In one example, the shock absorber 52 includes a first end 54 that is pivotally mounted to the lower control arm 22 at a position that is longitudinally offset from the first end 44 of the pedestal 42. A second end 56 of the shock absorber 52 is mounted to a vehicle frame structure.

Figure 3:
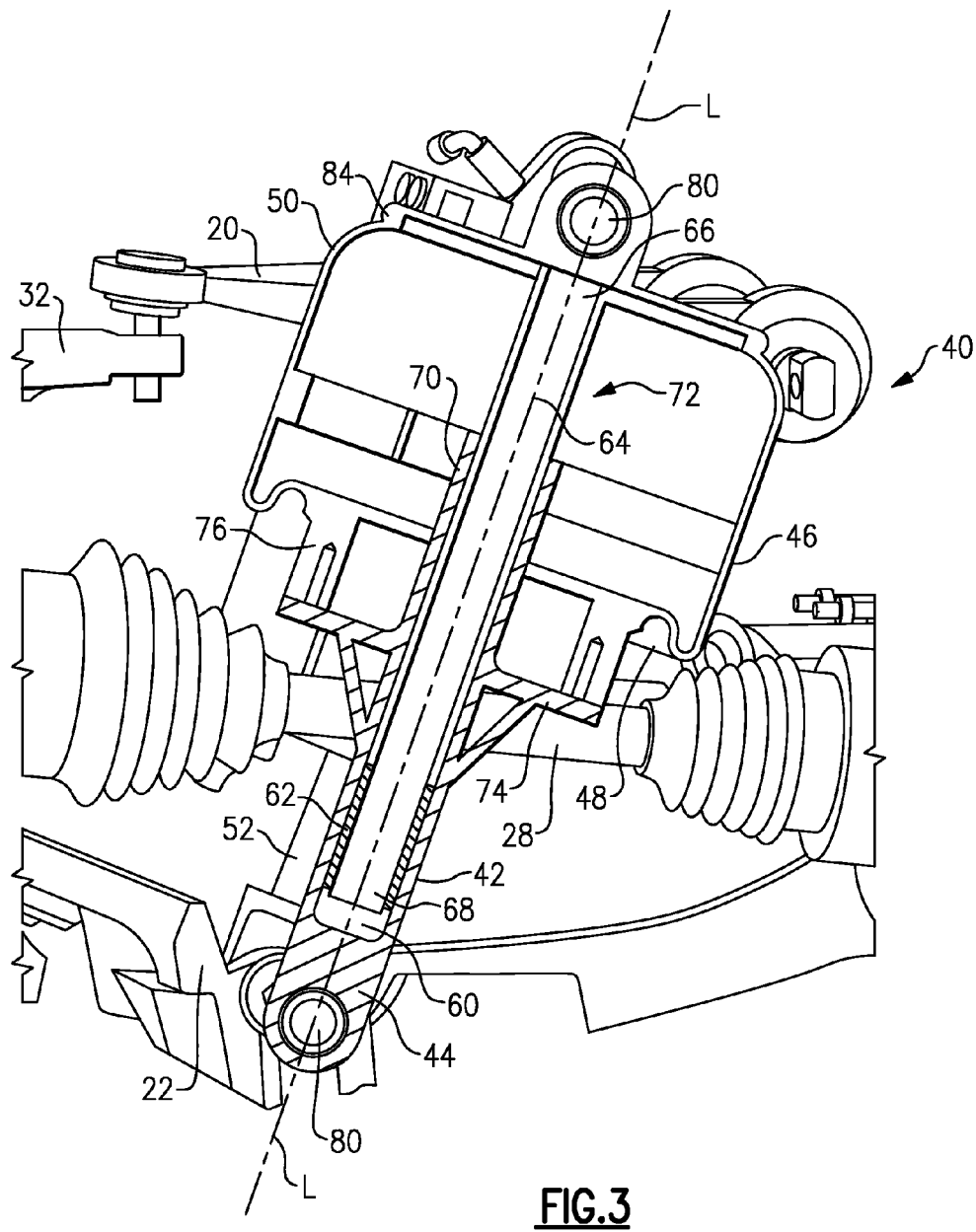
FIG. 3 is a cross-sectional view of an air spring assembly from the independent suspension of FIG. 2.

FIG. 3 shows the air spring assembly 40 in greater detail. The pedestal 42 comprises a tubular member having an inner cavity 60 that defines a linear axis of movement L. A linear bearing 62 is received within the inner cavity 60. A linear moveable member, such as a rod 64 for example, is directly received within the linear bearing 62. The rod 64 has a first rod end 66 that is associated with the upper portion 50 of the bellows 46 at the second mount interface and a second rod end 68 that is slidingly received within the linear bearing 62.

As discussed above, the first end 44 of the pedestal 42 is mounted to the lower control arm 22 at the first mount interface. A second end 70 of the pedestal 42 extends into an interior chamber 72 defined by the flexible bellows 46. A platform 74 is formed about an outer circumference of the pedestal near the second end 70. An air spring piston 76 is fixed to the platform 74. The lower portion 48 of the flexible bellows 46 is fixed to the air spring piston 76.

In the example shown, the first and second mount interfaces comprise spherical bearings 80 that include a bar pin mount 82 (FIG. 2), which allows the upper 50 and lower portions to rotate relative to each other. As such, the use of spherical bearings 80 provides movement in multiple degrees of freedom, and the bearings further cooperate to eliminate side loading on the air spring assembly 40. It should be understood that while spherical bearings are shown; other types of pivoting connection interfaces could be used at the first and second mount interfaces to allow rotation of the upper and lower portions and to reduce side loading.

A mounting plate 84 supports the bearing and bar pin mount 82. The bearing mount is thus external to the air spring assembly 40 and is directly attached to the vehicle frame structure.

Figure 5:
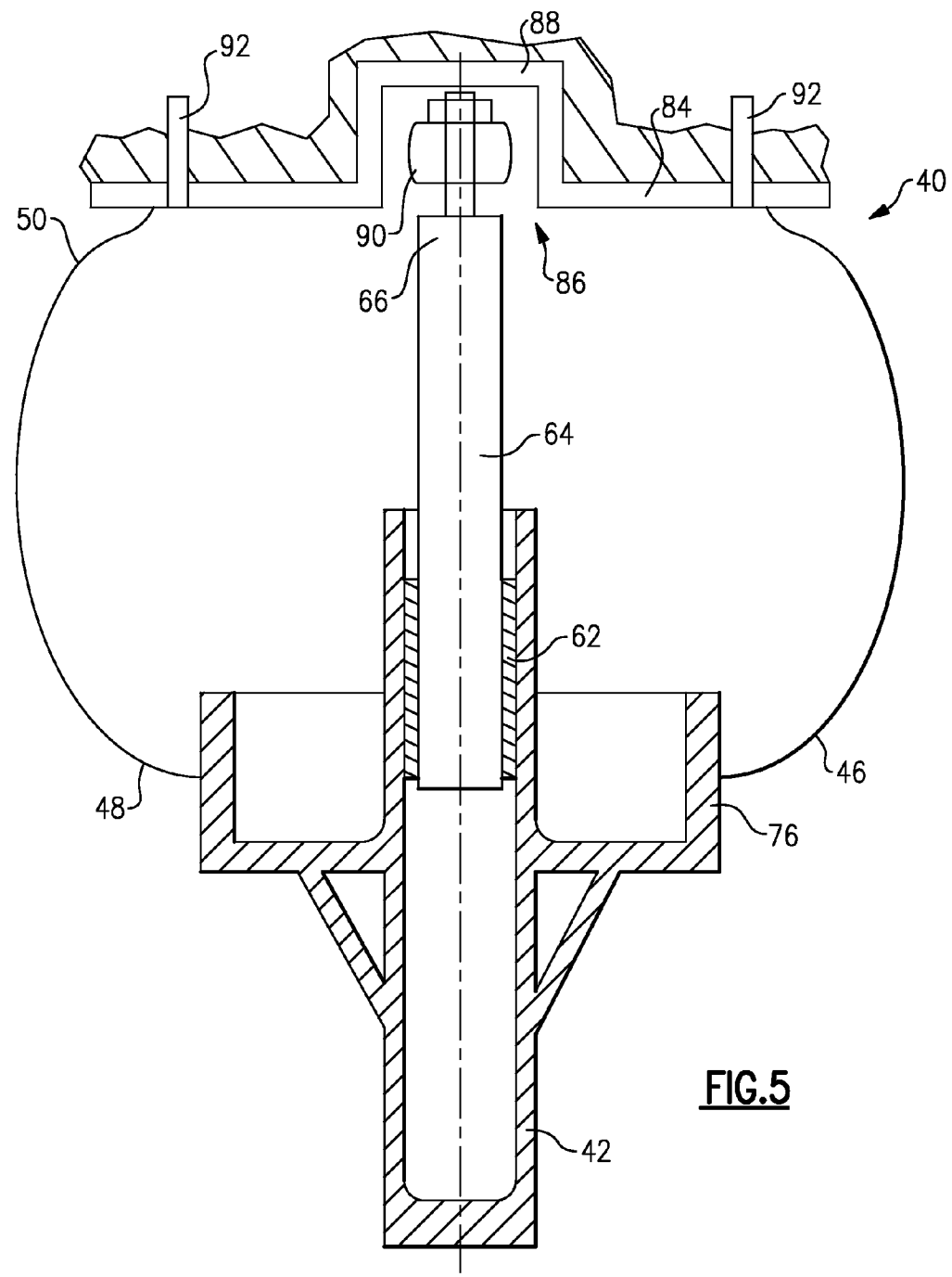
FIG. 5 shows another example of a mount interface between an upper portion of the air spring and a linear moveable member.

FIG. 5 shows an optional mount interface 86 between the rod 64 and the upper portion 50 of the bellows 46. In this configuration the mounting plate 84 is configured to include a hat portion 88 that receives a spherical bearing mount 90 that is mounted to the upper end of the rod 64. The mounting plate 84 includes separate fastening mounts 92 that are then rigidly connected to the vehicle frame structure. In this configuration, the bearing mount 90 is enclosed within the air spring assembly 40.

Figure 4A:
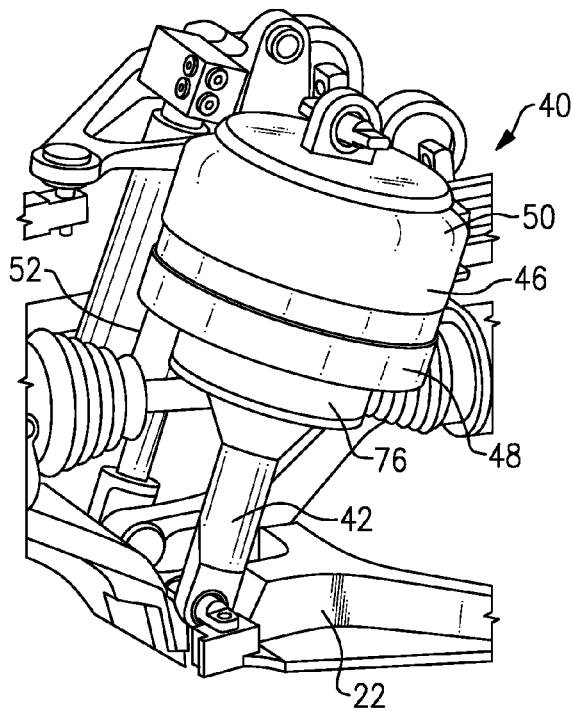
FIG. 4A is a perspective view of the air spring assembly in an intermediate position.
Figure 4B:
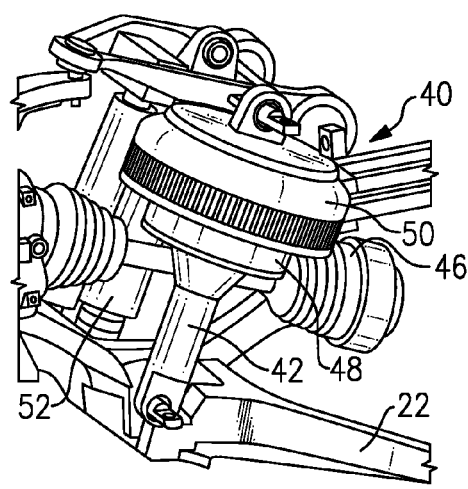
FIG. 4B shows the spring assembly of FIG. 4A at a jounce position.
Figure 4C:
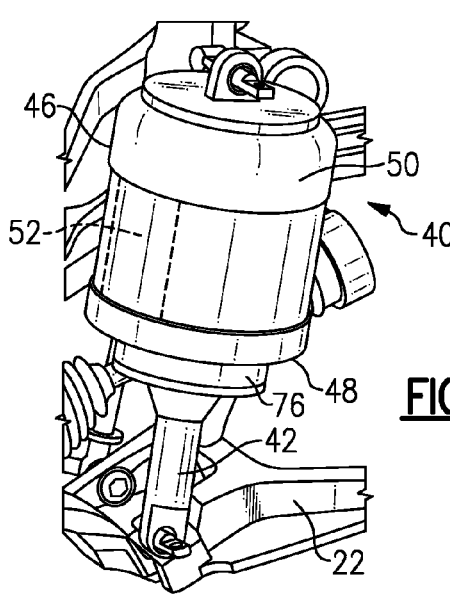
FIG. 4C shows the spring assembly of FIG. 4A at a rebound position.

FIG. 4A shows an example of the air spring assembly 40 in an intermediate position between an upper and lower extreme limit of vertical travel. During vertical articulation, the rod 64 moves back and forth within the pedestal 42 along the linear axis of movement L between jounce (FIG. 4B) and rebound (FIG. 4C) positions. FIG. 4B shows one extreme limit of vertical travel corresponding to a jounce position and FIG. 4C shows an opposite extreme limit of vertical travel corresponding to a rebound position. This movement allows the lower 48 and upper 50 portions of the bellows 46 to articulate linearly with respect to each other. The use of the linear bearing provides a significant range of travel for the air spring assembly 40.

The air spring assembly 40 comprises a self-guided configuration that provides a wide range of rebound/jounce vertical articulation by using a linear movement member, and which includes spring articulation assistance through the use of spherical bearing mounts. Further, the linear movement member, which utilizes a linear bearing, provides a shorter and more compact, light-weight configuration. Thus, the air spring assembly 40 provides excellent ground vehicle ride characteristics without incurring premature wear.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air spring assembly comprising:
    an air spring piston;
    a pedestal defining an internal cavity and having one end to be mounted to a suspension component at a first mount interface, said pedestal having a platform to which said air spring piston is fixed;
    a flexible bellows having a first portion attached to said air spring piston and a second portion to be fixed to a vehicle structure at a second mount interface; and
    a linear moveable member having a first end fixed to said second portion of said flexible bellows and a second end slidingly received within said internal cavity of said pedestal such that said first and said second portions of said flexible bellows articulate linearly with respect to each other.

2. The air spring assembly according to claim 1 wherein said first mount interface comprises a pivotal mount interface.

3. The air spring assembly according to claim 2 wherein said pivotal mount interface includes a spherical bearing.

4. The air spring assembly according to claim 1 wherein said second mount interface comprises a pivotal mount interface.

5. The air spring assembly according to claim 4 wherein said pivotal mount interface includes a spherical bearing.

6. The air spring assembly according to claim 1 including a first spherical bearing at said first mount interface and a second spherical bearing at said second mount interface.

7. The air spring assembly according to claim 1 including a linear bearing positioned within said internal cavity and wherein said linear moveable member comprises a rod with said second end of said rod being directly received within said linear bearing.

8. An independent suspension comprising:
    an upper control arm mountable to a vehicle wheel;
    a lower control arm mountable to the vehicle wheel;
    an air spring assembly mounted to one of said upper and said lower control arms, said air spring assembly including
        an air spring piston,
        a pedestal defining an internal cavity and having a first pedestal end mounted to said one of said upper and said lower control arms at a first mount interface, and said pedestal including a platform with said air spring piston being fixed to said platform,
        a flexible bellows having a first portion attached to said air spring piston and a second portion to be fixed to a vehicle structure at a second mount interface, and a linear moveable member having a first member end fixed to said second portion of said flexible bellows and a second member end slidingly received within said internal cavity of said pedestal such that said first and said second portions of said flexible bellows articulate linearly with respect to each other.

9. The independent suspension according to claim 8 wherein said upper and said lower control arms each comprise a wishbone arm having a base mountable to the vehicle wheel and a pair of arms pivotally mountable to a frame component.

10. The independent suspension according to claim 9 wherein said pedestal is mounted to said lower control arm.

11. The independent suspension according to claim 8 including a shock absorber that is mounted to one of said upper and said lower control arms independently of said air spring assembly.

12. The independent suspension according to claim 8 including a wheel drive shaft extending between said upper and said lower control arms in a lateral direction from a central carrier to drive the vehicle wheel.

13. The independent suspension according to claim 8 wherein said pedestal comprises a tubular member with a second pedestal end extending into an interior chamber defined by said flexible bellows, said tubular member including a linear bearing mounted within said internal cavity, and wherein said linear moveable member comprises a rod with said second member end being directly received within said linear bearing.

14. The independent suspension according to claim 13 wherein said platform is formed about an outer surface of said tubular member adjacent said second pedestal end.

15. The independent suspension according to claim 8 wherein at least one of said first and said second mount interfaces comprises a pivotable mount interface.

16. The independent suspension according to claim 15 wherein said pivotable mount interface comprises a spherical bearing.

* * * * *